United States Patent
Yasui et al.

(10) Patent No.: US 9,090,190 B2
(45) Date of Patent: Jul. 28, 2015

(54) VEHICLE SEAT STRUCTURE

(75) Inventors: Hiroyuki Yasui, Kanagawa (JP); Atsushi Sano, Kanagawa (JP); Atsushi Nakajima, Kanagawa (JP); Antoine Kmeid, Kanagawa (JP)

(73) Assignee: JOHNSON CONTROLS TECHNOLOGY COMPANY, Holland, MI (US)

( * ) Notice: Subject to any disclaimer, the term of this patent is extended or adjusted under 35 U.S.C. 154(b) by 427 days.

(21) Appl. No.: 13/395,872

(22) PCT Filed: Sep. 6, 2010

(86) PCT No.: PCT/JP2010/065258
§ 371 (c)(1),
(2), (4) Date: May 23, 2012

(87) PCT Pub. No.: WO2011/030736
PCT Pub. Date: Mar. 17, 2011

(65) Prior Publication Data
US 2012/0223565 A1      Sep. 6, 2012

(30) Foreign Application Priority Data

Sep. 14, 2009   (JP) .................................. 2009-211801
Sep. 14, 2009   (JP) .................................. 2009-211815

(51) Int. Cl.
*B60N 2/68*   (2006.01)
*B29C 45/14*  (2006.01)
(Continued)

(52) U.S. Cl.
CPC ............ *B60N 2/68* (2013.01); *B29C 45/14311* (2013.01); *B60N 2/682* (2013.01); *B60N 2/688* (2013.01); *B29K 2995/0072* (2013.01); *B29L 2031/30* (2013.01); *B29L 2031/3055* (2013.01); *B29L 2031/771* (2013.01)

(58) Field of Classification Search
CPC .......... B60N 2/68; B60N 2/686; B60N 2/682; B60N 2/688; B29C 45/14311; B29K 2995/0072; B29L 2031/30; B29L 2031/771; B29L 2031/3055
USPC ................. 297/452.18, 216.13; 403/365, 364
See application file for complete search history.

(56) References Cited

U.S. PATENT DOCUMENTS 1,747,964 A  *  2/1930  Wirth ............................. 403/265
3,451,719 A  *  6/1969  De Lorean .................... 297/468
(Continued)

FOREIGN PATENT DOCUMENTS

CN       101528437 A       9/2009
DE       10008204 A1  *    9/2001
(Continued)

OTHER PUBLICATIONS

Office Action dated Jun. 18, 2014 in corresponding Chinese Patent Application No. 201080040940.3.
(Continued)

*Primary Examiner* — Milton Nelson, Jr.
(74) *Attorney, Agent, or Firm* — Foley & Lardner LLP

(57) ABSTRACT

A metallic seat structure member with a surface roughened is placed within a forming die, into which synthetic resin is injected for molding. This provides a vehicle seat structure in which leg portions of a strength member made of synthetic resin are fixed to the roughened surface of the seat structure member.

6 Claims, 12 Drawing Sheets

(51) Int. Cl.
  *B29L 31/30* (2006.01)
  *B29L 31/00* (2006.01)

(56) References Cited

U.S. PATENT DOCUMENTS

| | | |
|---|---|---|
| 5,029,942 A | 7/1991 | Rink |
| 2003/0211265 A1 | 11/2003 | Balbaugh et al. |
| 2005/0168041 A1* | 8/2005 | Glance et al. ............ 297/452.18 |
| 2008/0070001 A1 | 3/2008 | Lasarov et al. |
| 2008/0127479 A1 | 6/2008 | Naritomi et al. |
| 2013/0119743 A1* | 5/2013 | Evans et al. ............... 297/452.18 |

FOREIGN PATENT DOCUMENTS

| | | |
|---|---|---|
| FR | 2965520 A1 * | 4/2012 |
| JP | 54-160465 A | 12/1979 |
| JP | 02-195908 A | 8/1990 |
| JP | 2000-271957 A | 10/2000 |
| JP | 2001-001862 A | 1/2001 |
| JP | 2001-225352 A | 8/2001 |
| JP | 2004-216425 A | 8/2004 |
| JP | 2004-229688 A | 8/2004 |
| JP | 2007-008272 A | 1/2007 |
| JP | 2007-301972 A | 11/2007 |
| JP | 2008-184144 A | 8/2008 |
| WO | WO-2008/047811 A1 | 4/2008 |
| WO | WO 2009052916 A1 * | 4/2009 |

OTHER PUBLICATIONS

Supplementary European Search Report in European Application No. 10 815 333.9 dated Jun. 27, 2014, 7 pages.
Notification of Reasons for Refusal mailed Oct. 29, 2013, as received in corresponding Japanese Patent Application No. 2009-211801, and English language translation of the same.
International Search Report dated Oct. 19, 2010 as received in corresponding PCT Application No. PCT/JP2010/065258, 4 pages.
Microfilm of the specification and drawings annexed to the request of Japanese Utility Model Application No. 167380/1985(Laid-open No. 75916/1987) (Toyota Auto Body Co., Ltd.),May 15, 1987.
Microfilm of the specification and drawings annexed to the request of Japanese Utility Model Application No. 74739/1985 (Laid-open No. 190251/1986) (Fuji Heavy Industries Ltd.), Nov. 27, 1986.
Office Action in corresponding Chinese Application No. 201080040940.3 dated Nov. 5, 2013, 8 pages.
Office Action in corresponding Chinese Application No. 201080040940.3 dated Jun. 18, 2014 (7 pages).

* cited by examiner

VEHICLE SEAT STRUCTURE

CROSS REFERENCE TO RELATED APPLICATIONS

The present application is a National Stage of International Application No. PCT/JP2010/065258 filed on Sep. 6, 2010, which claims the benefit of Japanese Patent Application No. 2009-211801 filed on Sep. 14, 2009, and which claims the benefit of Japanese Patent Application No. 2009-211815 filed on Sep. 14, 2009, the entire disclosures of all of which are incorporated herein by reference.

TECHNICAL FIELD

The present invention relates to a seat structure for vehicles such as automobiles, ships, aircrafts, and railroad cars.

BACKGROUND ART

Conventional seat structures for vehicles, especially seat structures for automobiles generally include seat back frames as the frames of seat backs supporting occupants. Such a seat back frame is formed as a single casting piece obtained by casting an aluminum alloy. Moreover, an attachment portion of a retractor (a supporting portion) is supported near a side edge of the seat back frame on the sidewall of the vehicle body. A reinforcement portion configured to support load acting on the seat back in the longitudinal direction of the vehicle body is provided for a part extending from the attachment portion of the retractor to the lower end of the seat back frame in the vertical direction (see PTL 1).

As for the frame body including the seat back frame and a seat cushion frame, an iron plate is punched out by pressing and is then subjected to drawing to form a deep beed and the like. The frame body thus has enough strength to support an occupant sitting on the seat (see PTL 2).

CITATION LIST

Patent Document

[PTL 1] Japanese Patent Laid-open Publication No. 2004-229688
[PTL 2] Japanese Patent Laid-open Publication No. 7-031526

SUMMARY OF INVENTION

The seat back frame disclosed in PTL 1 includes a high strength honeycomb structure as the reinforcement portion and is previously reinforced so as to withstand high load caused by collision of the automobile or the like. However, the high-strength honeycomb structure requires reinforcement by metallic material, an increase in plate thickness, or the like, thus increasing the weight of the seat back frame and the like. Accordingly, the fuel efficiency of the automobile is lowered.

The frame body disclosed in PTL 2 requires deep drawing. However, it is difficult just to perform drawing for high-tensile steel plate and the like, and the material of the frame body is limited. Moreover, shallow drawing cannot give enough strength to the frame body.

In the light of the aforementioned problems, an object of the present invention is to provide a vehicle seat structure including a lightweight means which sufficiently withstand impact and load applied to a metallic seat structure member such as a seat back frame.

Moreover, another object of the present invention is to provide a vehicle seat structure which can provide a high-strength seat structure member without using deep drawing independently of choice of the metallic material of the frame body.

Solution to Problem

In order to solve the aforementioned problems, a vehicle seat structure according to a first aspect of the present invention includes: a metallic seat structure member with a surface roughened; and a strength member made of synthetic resin. The seat structure member is placed within a forming die, into which synthetic resin is injected for molding to fix a leg portion of the strength member made of the synthetic resin to the roughened surface of the seat structure member.

A vehicle seat structure according to a second aspect of the present invention includes: metallic seat structure members each of which has a surface roughened to depth of nanometer-scale and is plate-shaped or bent; and a strength member made of hard synthetic resin. The metallic seat structure members are placed within a forming die, into which the synthetic resin is injected for molding to fix a leg portion of the strength member made of the synthetic resin to the roughened surface of each seat structure member.

Advantageous Effects of Invention

According to the first aspect of the present invention, it is possible to provide a vehicle seat structure including a lightweight means capable of sufficiently withstanding impact and load applied to the metallic seat structure member such as a seat back frame.

According to the second aspect of the present invention, it is possible to provide a vehicle seat structure capable of providing a strong seat structure member without using deep drawing independently of choice of the metallic material of the frame body and the like.

DESCRIPTION OF EMBODIMENTS

First Embodiment

Figure 1:
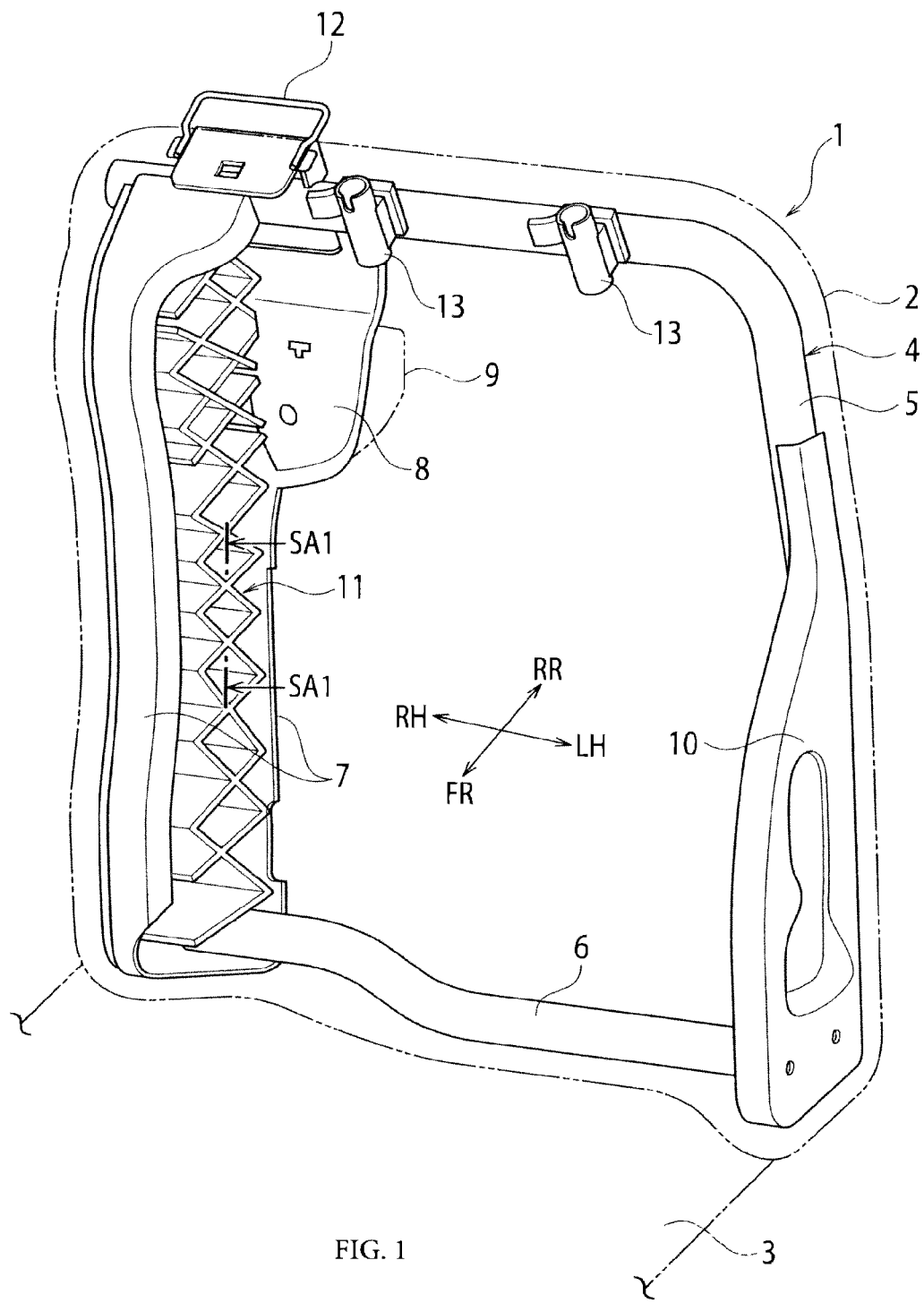
FIG. 1 is a perspective view showing a transportation seat according to a first embodiment of the present invention, particularly showing a structure member of the transportation seat.

Hereinafter, a description is given of embodiments of the present invention in detail with reference to the drawings. First, a first embodiment of the present invention is described taking an automobile as an example of vehicles with reference to FIGS. 1 to 3. An automobile seat structure 1 according to the first embodiment includes: a seat back 2; a seat cushion 3; and a reclining device (not shown) supporting part between the seat back 2 and seat cushion 3. The seat back 2 includes: a seat structure member 4; a not-shown buffer provided for the seat structure member 4; and a skin covering the seat structure member 4 and the buffer. A not-shown head rest is supported on the top of the seat back 2. Reference numeral 9 indicates a seat belt retractor.

The seat structure member 4 includes: a pipe-shaped first member 5 having a substantially reverse L shape in, a front view (shown in FIG. 1); a second member 7 welded to the first member 5 and a later-described third member 6; and the third member 6 welded to lower ends of the second member 7 and the first member 5. As shown in FIG. 1, to the second member 7, a strength member 11 is fixed from the upper end to the lower end thereof. The strength member 11 includes plural substantially honeycomb continuous structures.

Figure 2:
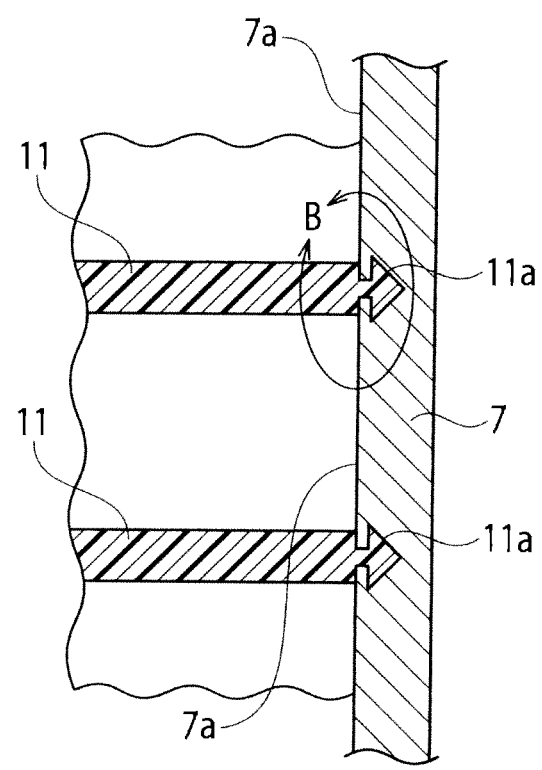
FIG. 2 is a cross-sectional view schematically showing a cross-section along a line SA1-SA1 of FIG. 1.
Figure 3:
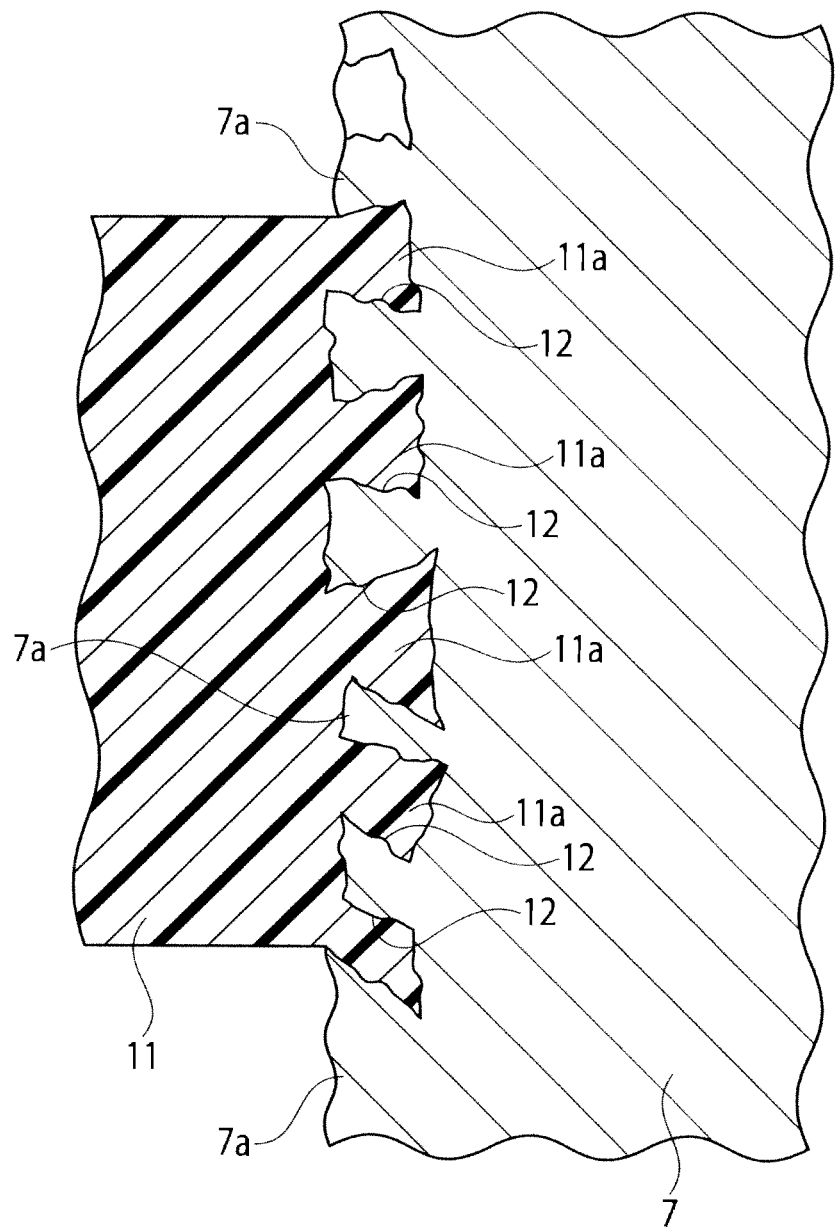
FIG. 3 is an enlarged cross-sectional view of a part B of FIG. 2 which is observed with an electron microscope.

The second member 7 is made of an iron plate. As shown in FIG. 2, wedge-shaped recesses are formed in the surface 7a of the second member 7 after rust and oil are removed. PPS (polyphenylene sulfide) as hard synthetic resin is poured into the wedge-shaped recesses formed in the surface 7a and is then hardened, thus forming wedge-shaped leg portions 11a. The strength member 11 is firmly supported on the surface 7a of the second member 7 through the leg portions 11a. In a view of a part B of FIG. 2 with an electronic microscope, as shown in FIG. 3, nanometer-scale anchor-shaped recesses 12 are formed in the entire surface 7a of the second member 7. To be specific, the size of the recesses 12 is 20 to 50 nanometers (nm). The leg portions 11a are embedded in the recesses 12.

In the upper end of the second member 7, a retractor bracket 8 supporting the seat belt retractor 9 on a surface to a rear side RR is integrally formed. Reference numeral 12 indicates a guide member which guides a seat belt (not shown) rewound by the seat belt retractor so that the seat belt properly supports the occupant's shoulder. Reference numerals 13 and 13 indicate holders which are supported on the top of the first member 5 so as to support stays of the head rest. Reference numeral 10 indicates a side plate which is supported on the side part of the first member 5 to support an upper member of a not-shown reclining device.

Figure 4:
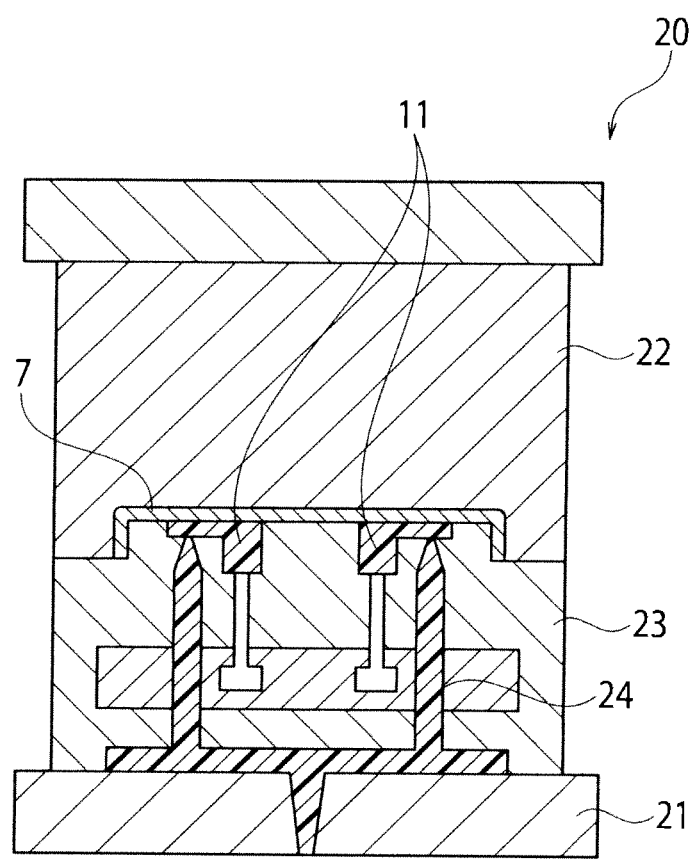
FIG. 4 is a cross-sectional view of a closed die schematically showing a situation where the seat structure member of FIG. 1 is put in a die for injection molding of a strength member.
Figure 5:
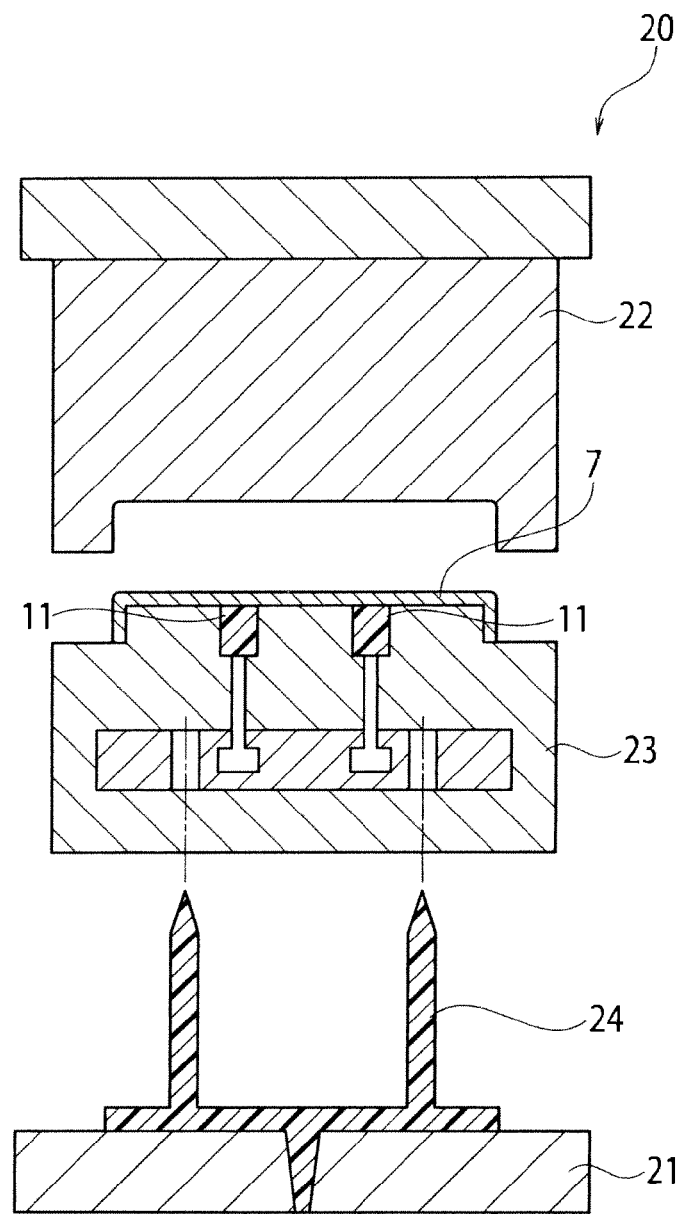
FIG. 5 is a cross-sectional view schematically showing a seat structure member including a strength member existing between a second movable die and the movable die of FIG. 4 which is opened.
Figure 6:
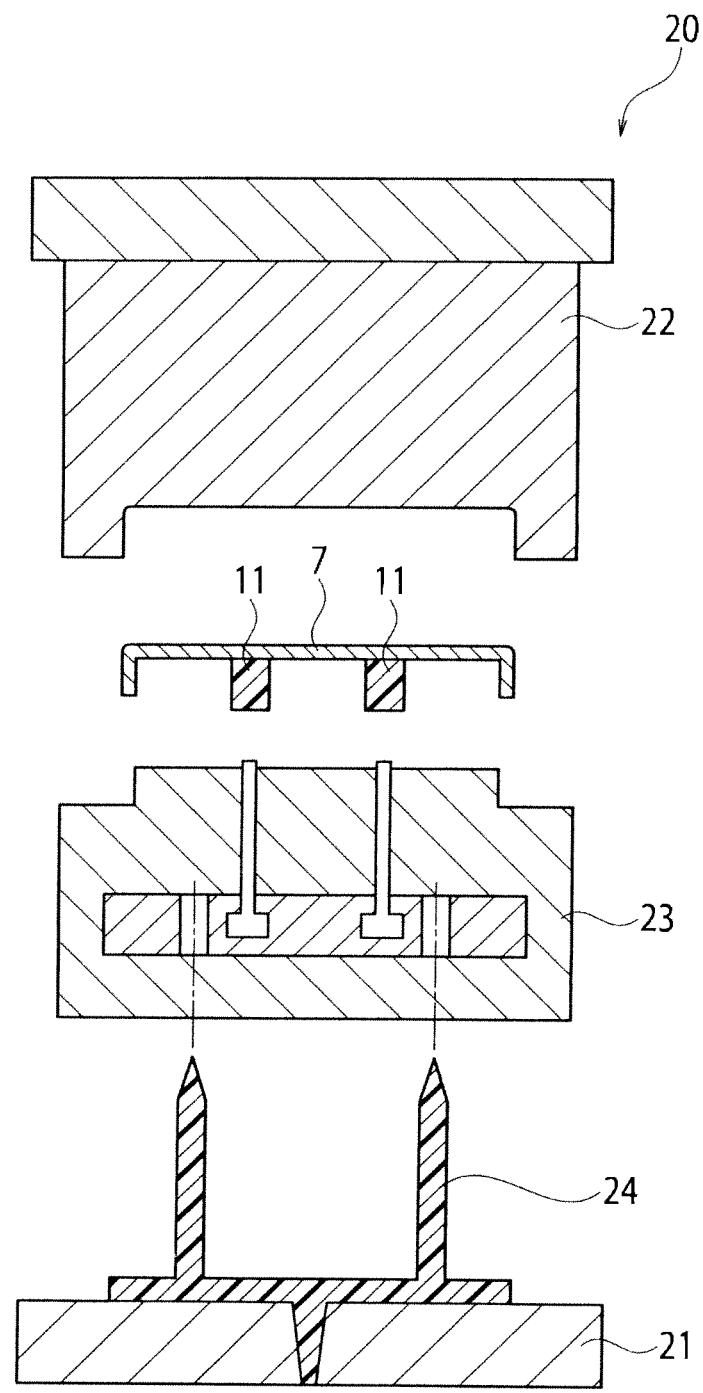
FIG. 6 is a cross-sectional view schematically showing a state where the seat structure member is detached from the second movable die of FIG. 5.

The strength member 11 is made of PPS (polyphenylene sulfide) as the hard synthetic resin. First, the second member 7 is supported within a second movable die 23 arranged between a fixed die 21 and a movable die 22 of a forming die 20 shown in FIGS. 4 to 6. In this state, the hard synthetic resin is injection-molded. To be specific, PPS (polyphenylene sulfide) as the hard synthetic resin is poured onto the rough surface of the surface 7a of the second member 7, that is, the surface where the recesses 12 are formed, to be solidified. Each of the leg portions lie thus form a wedge shape schematically shown in FIG. 2. Actually, in a view with an electronic microscope, as shown in FIG. 3, the hard synthetic resin is poured into the recesses 12 to be solidified, thus forming the leg portions 11a of the strength member 11. The leg portions 11a of the strength member 11 are therefore firmly supported by the second member 7. Reference numeral 24 in FIGS. 4 to 6 indicates a means of injecting PPS (polyphenylene sulfide) as the hard synthetic resin.

As described above, according to the first embodiment, the following operational effects can be obtained.

The second member 7 of the metallic seat structure member 4 with the surface 7a roughened is placed within a forming die 20, and the synthetic resin is injected into the forming die 20 for molding. The leg portions 11a of the strength member 11 which are made of synthetic resin are therefore fixed to the roughened surface 7a of the second member 7. The leg portions 11a of the strength member 11 made of the synthetic resin can be firmly supported on the roughened surface 7a. Since the strength members 11 are made of synthetic resin, therefore, the seat structure member 4 can be lightweight although the strength of the second member 7 of the seat structure member 4 is considerably increased. Furthermore, the second member 7 itself of the seat structure member 4 can be made thin.

Moreover, the strength member 11 is made of PPS (polyphenylene sulfide) as the hard synthetic resin. This ensures integration of the strength member 11 made of the synthetic resin with the second member 7 of the metallic seat structure member 4.

Furthermore, the second member 7 of the seat structure member 4 is made of an iron material. Accordingly, the hard synthetic resin can be surely poured into the recesses 12 formed in the roughened surface 7a to firmly fix the leg portions 11a of the strength member 11.

Furthermore, the strength member 11 includes plural continuous substantially honeycomb-shaped structures and can disperse the impact and load applied to the second member 7 of the seat structure member 4. This ensures absorption of the impact.

Furthermore, the plural recesses 12 having depth of nanometer scale are formed in the roughened surface 7a of the second member 7 of the seat structure member 4. Accordingly, a person who touches the surface 7a of the second member 7 of the seat structure member 4 does not feel the recesses 12. The second member 7 requires just a simple surface treatment, and the manufacturing cost can be low.

Furthermore, the point of load applied to the second member 7 of the seat structure member 4 is located at the supporting portion of the seat belt retractor 9. In the supporting portion of the seat belt retractor 9, the retractor bracket 8 is placed. Accordingly, high load due to sudden braking of the automobile or the like is added to the retractor bracket 8 through the seat belt. The second member 7 of the seat structure member 4 supporting the retractor bracket 8 is reinforced by the strength member 11 made of synthetic resin and therefore can sufficiently hold the load applied to the second member 7.

In the description of the first embodiment, the point of load applied to the second member 7 is at the supporting portion of the seat belt retractor 9. In this case, high load due to sudden braking of the automobile or the like will be applied to the supporting portion of the not-shown reclining device through the seat back 2. Since the second member 7 of the seat structure member 4 supporting the supporting portion of the reclining device is reinforced by the strength member 11 made of synthetic resin, the second member 7 can adequately bear the load applied to the second member 7.

Moreover, in the description of the first embodiment, the second member 7 of the seat structure member 4 is made of an iron plate. However, the second member 7 may be made of aluminum, magnesium, copper, stainless, titanium, or brass instead of the iron plate. The hard synthetic resin can be surely poured into the recesses 12 formed in the roughened surface 7a to firmly fix the leg portions 11a of the strength member 11.

In the description of the first embodiment, the strength member 11 made of synthetic resin is made of PPS (polyphenylene sulfide). However, instead of PPS (polyphenylene sulfide), the strength member 11 may be made of PBT (polybutylene terephthalate) or PA (polyamide) This ensures the integration of the strength member 11 of synthetic resin with the second member 7 of the metallic seat structure member 4.

Furthermore, in the description of the first embodiment, an example of the vehicle seat structure is the automobile seat structure. However, the vehicle seat structure is not limited to the automobile seat structure and may be a vehicle seat structure for ships, aircrafts, railroad cars, or the like.

Second Embodiment

Figure 7:
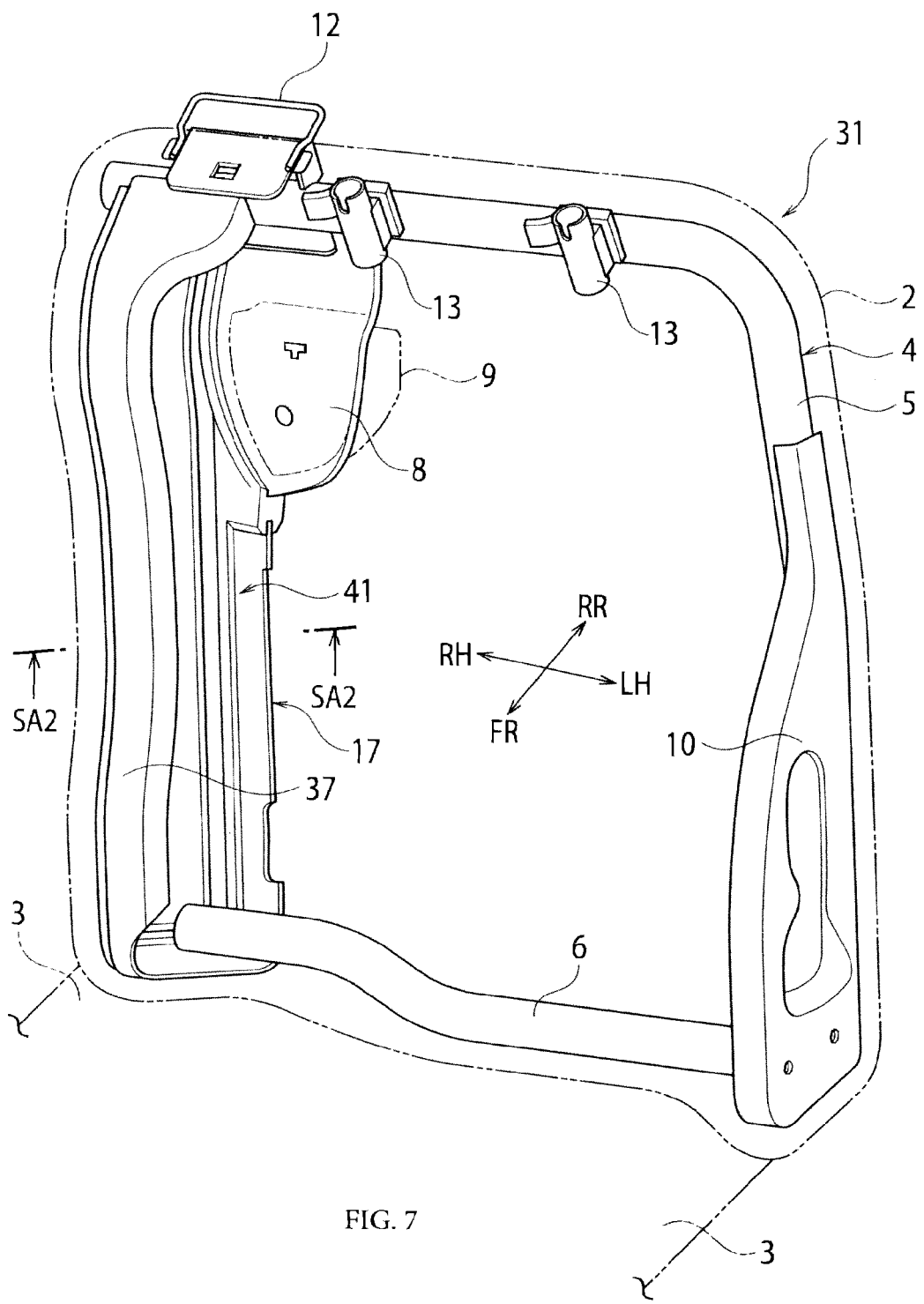
FIG. 7 is a perspective view showing a vehicle seat according to a second embodiment of the present invention, particularly showing a structure member of the vehicle seat.
Figure 8:
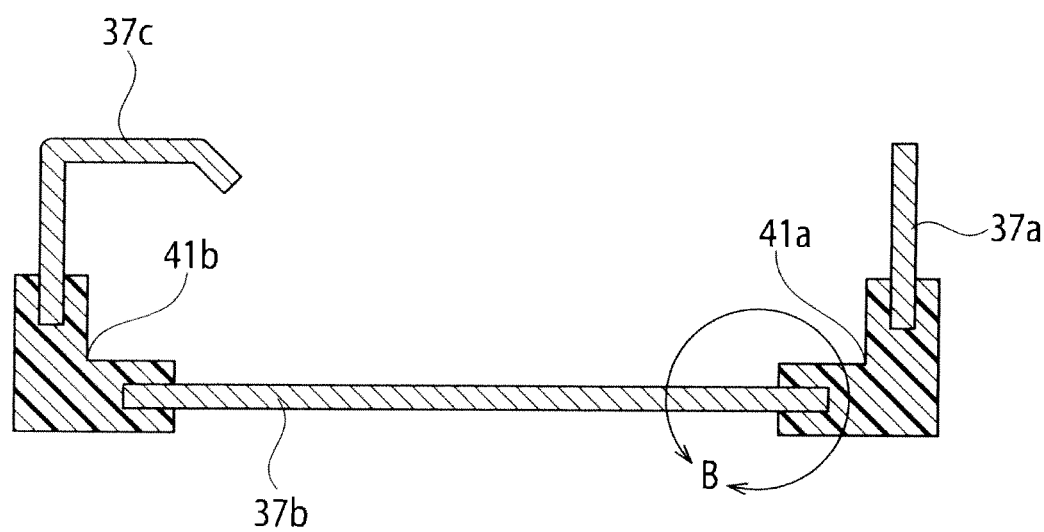
FIG. 8 is a cross-sectional view schematically showing a cross-section along a line SA2-SA2 of FIG. 7.
Figure 9:
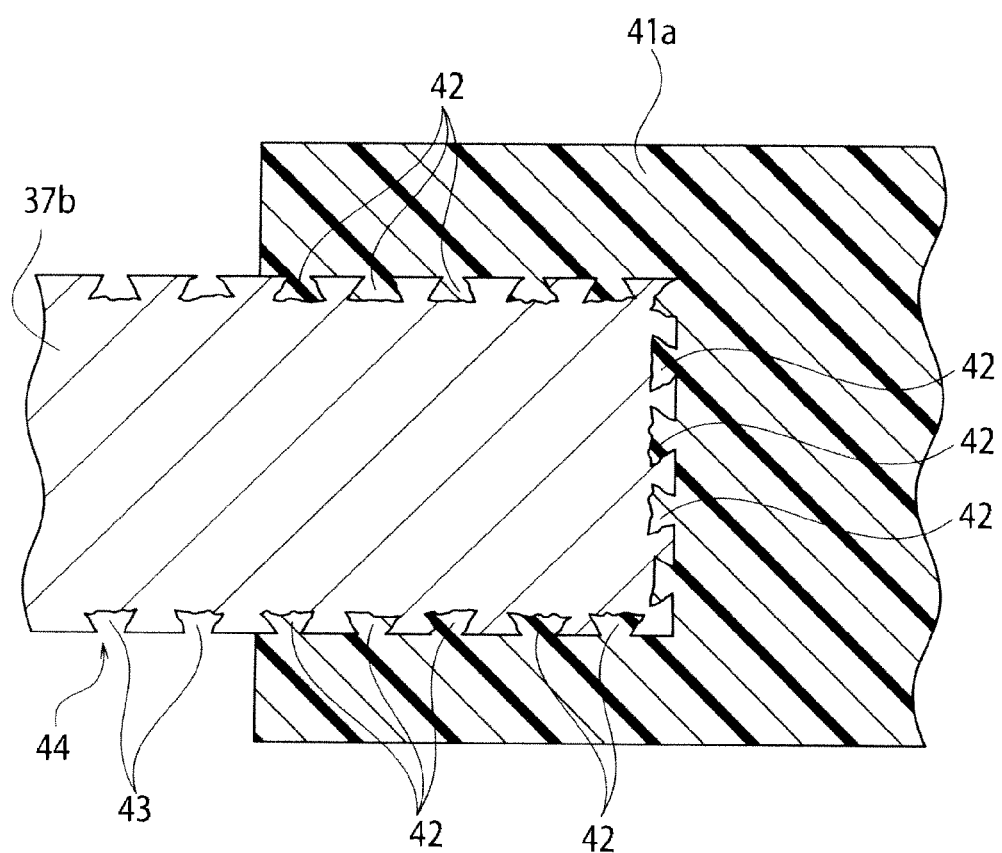
FIG. 9 is an enlarged cross-sectional view of a part B of FIG. 8 which is observed with an electron microscope.

Next, a description is give of an automobile seat structure 31 according to a second embodiment of the present invention using FIGS. 7 to 9. The automobile seat structure 31 according to the second embodiment of the present invention includes a seat back 2, a seat cushion 3, and a reclining device (not shown) supporting a part between the seat back 2 and the seat cushion 3. The seat back 2 includes a seat structure member 4, a not-shown buffer material provided for the seat structure member 4, and a skin covering the seat structure member 4 and the buffer material. A not-shown head rest is supported on the top of the seat back 2. Reference numeral 9 indicates a seat belt retractor.

The seat structure member 4 includes: a first member 5 composed of an iron pipe having a substantially reverse L shape in a front view (see FIG. 7); a second member 37 which is extended in the vertical direction to the right side RH of the first member 5 and is welded to the first member 5 and a later-described third member 6; and the third member 6 welded to the lower ends of the second member 37 and the first member 5.

In the upper end of the second member 37, the retractor bracket 8 supporting the seat belt retractor 9 on the rear side RR is integrally formed. Reference numeral 12 of FIG. 7 indicates a guide member which guides a seat belt (not shown) rewound by the seat belt retractor 9 so that the seat belt can properly support the occupant's shoulder.

As shown in FIG. 8, the second member 37 includes a rear plate 37a, a side plate 37b, and a front plate 37c, each of which is composed of an iron plate. The rear and side plates 37a and 37b have a plate shape, and the front plate 37c is subjected to bending. The rear and side plates 37a and 37b are connected by a first strength member 41a, and the side and front plates 37b and 37c are connected by a second strength member 42a. The strength members 41a and 41b are made of PPS (polyphenylene sulfide). The rear, side, and front plates 37a to 37b are connected through the strength members (41a and 4b) to form a single continuous member (the second member 37).

After removal of rust and oil sticking to the surface of the side plate 37b, as shown in FIG. 9, nanometer-scale anchor-shaped recesses 43 are formed in the entire surface 44 of the side plate 37b. To be specific, each anchor-shaped recess 43 has a size of 20 to 50 nanometers (nm). Forming the recesses 43 provides the surface (rough surface) 44 roughened to depth of nanometer scale. PPS (polyphenylene sulfide) is poured into the recesses 43 formed in the surface 44 of the side plate 37 to be solidified, thus forming wedge-shaped leg portions 42. The first strength member 41a is firmly fixed to the surface 44 of the side plate 37b by the leg portions 42. FIG. 9 shows the connection between the side plate 37b and the first strength member 41a. However, the connections of the rear, side, and front plates 37a, 37b, and 37c with the strength members (41a and 41b) have the same structure.

Figure 10:
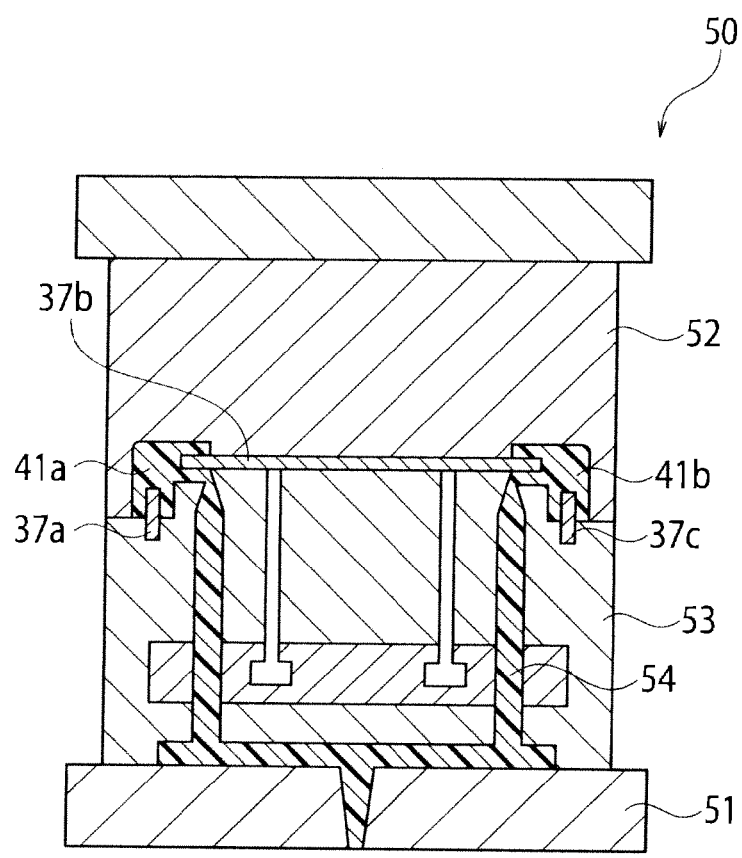
FIG. 10 is a cross-sectional view of a closed die schematically showing a situation where a plate member of the seat structure member of FIG. 7 is put in a die for injection molding of a strength member.
Figure 11:
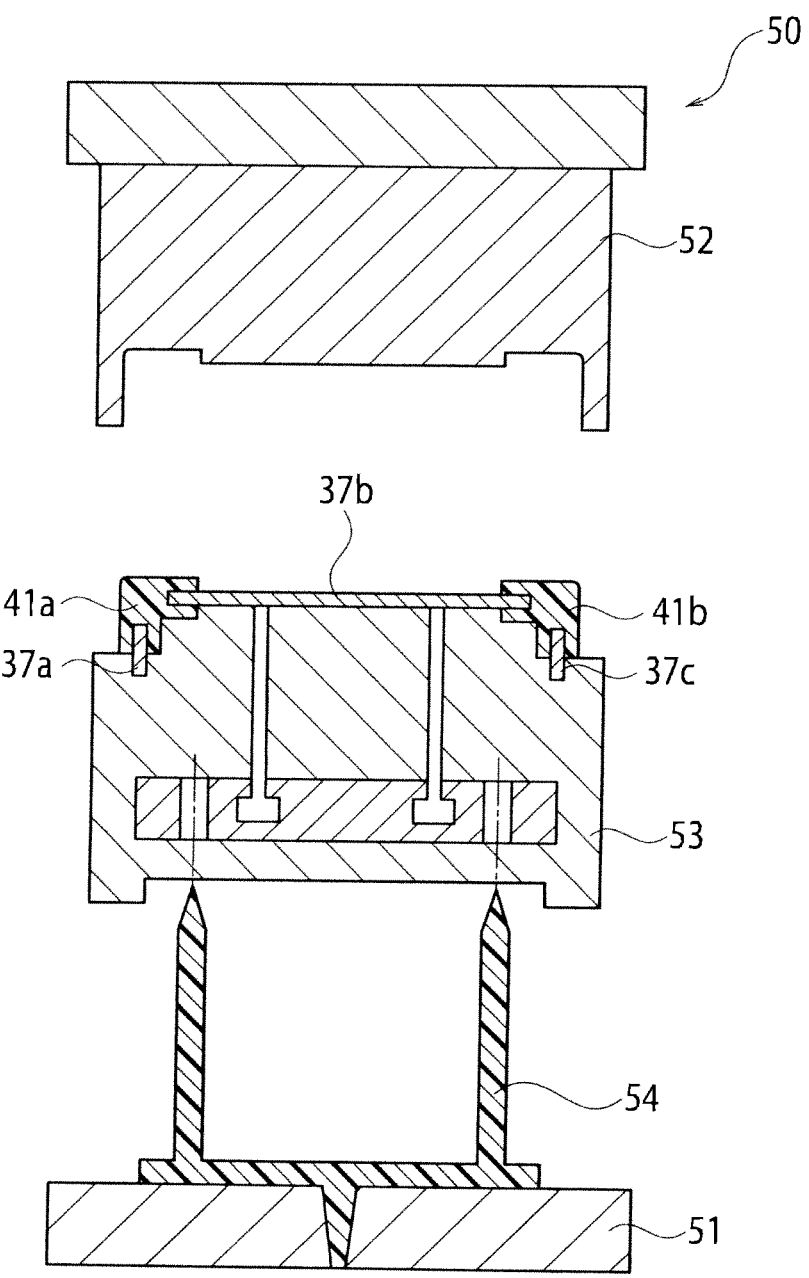
FIG. 11 is a cross-sectional view schematically showing a seat structure member including a strength member existing between a second movable die and a movable die of FIG. 10 which is opened.
Figure 12:
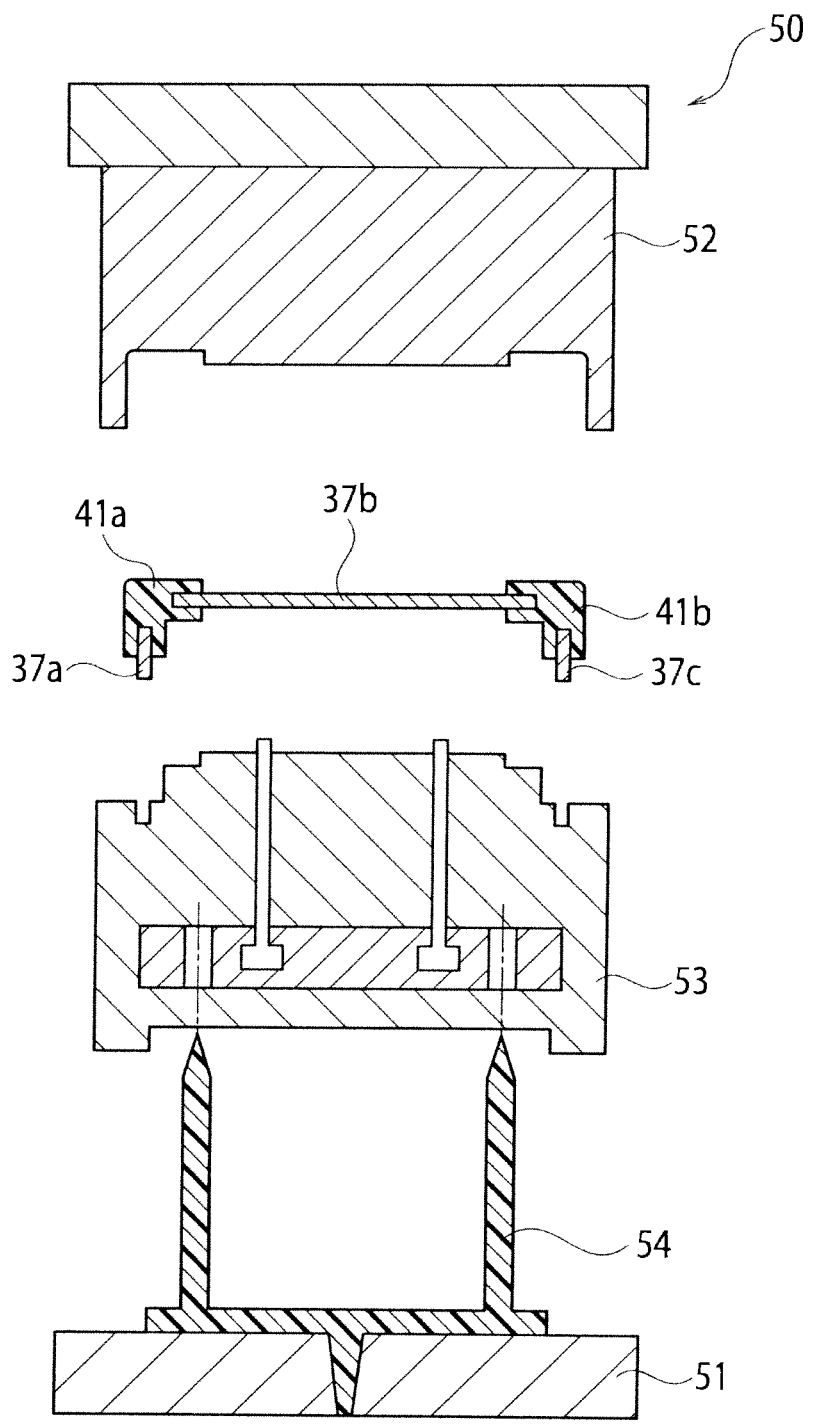
FIG. 12 is a cross-sectional view showing a state where the seat structure member is detached from the second movable die of FIG. 11.

The rear, side, and front plates 37a, 37b, and 37c are arranged and held in a squared U shape within a second movable die 53 provided between a fixed die 51 and a movable die 52 of a forming die 50 shown in FIGS. 10 to 12. In this state, hard synthetic resin is injected into between the rear and side plates 37a and 37b and between the side and front plates 37b and 37c for molding. To be specific, PPS (polyphenylene sulfide) as the hard synthetic resin is poured into the recesses 43 formed in the surfaces 44 of the rear, side, and front plates 37a, 37b, and 37c to be solidified. As shown in FIG. 9, the hard synthetic resin is poured into the recesses 43 and then hardened to form the leg portions 42 of the strength members (41a and 41b). The leg portions 42 of the strength members (41a and 41b) therefore strongly support the rear, side, and front plates 37a, 37b, and 37c. Accordingly, the rear, side, and front plates 37a, 37b, and 37c form a single continuous member. Reference numeral 54 in FIGS. 10 to 12 indicates a means for injecting PPS (polyphenylene sulfide) as the hard synthetic resin.

As described above, according to a second embodiment, the following operational effects can be obtained.

The metallic rear, side, and front plates 37a, 37b, and 37c, which have the surfaces 44 roughened to depth of nanometer scale and are plate-shaped or bent, are placed within the forming die 50, and the hard synthetic resin is then injected for molding. At this time, the leg portions 42 of the strength members (41a and 41b) made of the hard synthetic resin are firmly fixed to the surfaces 44 roughened to the nanometer-scale depth. The strength members (41a, 41b) can therefore firmly support the rear, side, and front plates 37a, 37b, and 37c to form a single continuous member (the second member 37). The second member 37 has therefore strength considerably increased although the rear, side, and front plates 37a, 37b, and 37c are just plate-shaped or bent. Accordingly, the strong seat structure member 4 may be formed without deep drawing independently of choice of the metallic material of the frame and the like.

Moreover, the nanometer-scale recesses 43 are formed in the roughened surfaces 44 of the second member 37, and a person who touches the surface of the second member 37 do not feel the recesses. Accordingly, it is necessary to perform just an easy surface treatment, thus reducing the manufacturing cost.

Furthermore, the strength members (41a, 41b) are made of PPS (polyphenylene sulfide) as the hard synthetic resin. This can ensure integration of the strength members (41a, 41b) made of synthetic resin with the metallic second member 37.

Furthermore, the second member 37 of the seat structure member is made of an iron material. Accordingly, the hard synthetic resin is surely poured into the recesses 43 formed in the roughened surface 44 to firmly fix the leg portions 42, of the strength members (41a, 41b).

Still furthermore, the rear, side, and front plates 37a, 37b, and 37c are connected by the strength members (41a, 41b).

Such a structure can disperse impact load applied to the second member 37, thus ensuring absorption of the impact.

In the description of the second embodiment, the material of the second member 37 of the seat structure member 4 is an iron plate. However, the material of the second member 37 may be aluminum, magnesium, copper, stainless, titanium, or brass instead of the iron plate. The hard synthetic resin can be surely poured into the recesses 12 formed in the roughened surface 7a to firmly fix the leg portions 11a of the strength members 11.

Moreover, in the description of the first embodiment, the strength members (41a, 41b) made of synthetic resin is made of PPS (polyphenylene sulfide). However, instead of PPS (polyphenylene sulfide), the strength member 11 may be made of PBT (polybutylene terephthalate) or PA (polyamide). This ensures integration of the strength members (41a, 41b) of the synthetic resin with the second member 37 of the metallic seat structure member 4.

Furthermore, the description of the second embodiment is given with the automobile seat structure as an example of the vehicle seat structure. However, the vehicle seat structure is not limited to the automobile seat structure and may be a vehicle seat structure for ships, aircrafts, railroad cars, or the like.

This invention is based upon and claims the benefit of priority to Japanese Patent Applications No. P2009-211815, filed on Sep. 14, 2009 and No. P2009-211801, filed on Sep. 14, 2009, the entire contents of which are incorporated herein by reference.

INDUSTRIAL APPLICABILITY

In the vehicle seat structure according to the first embodiment of the present invention, the second member 7 of the metallic seat structure member 4 with the surface roughened is placed within the forming die 20, and synthetic resin is injected into the forming die 20 for molding. The leg portions 11a of the strength member 11 made of synthetic resin are therefore firmly fixed to the roughened surface 7a of the second member 7. According to the vehicle seat structure, the leg portions 11a of the strength members 11 made of synthetic resin can be fixed to the roughened surface 7a of the second member 7. It is therefore possible to provide a vehicle seat structure including a lightweight means capable of sufficiently withstanding the impact load applied to the metallic seat structure member such as a seat back frame.

Moreover, in the second embodiment of the present invention, the members (37a, 37b, and 37c) of the metallic second member 37 which is plate shaped or bent and has the surfaces 44 roughened to depth of nanometer scale are arranged in a squared U shape within the forming die 50, and hard synthetic resin is then injected into for molding. The leg portions 42 of the strength members (41a and 41b) are therefore firmly fixed to the surface 44 of each member (37a to 37c). Accordingly, it is possible to provide a vehicle seat structure including the strong second member 37 without deep drawing independently of choice of the metallic material of the frame and the like.

Consequently, the vehicle seat structures according to the first and second embodiments of the present invention are industrially applicable.

The invention claimed is:

1. A vehicle seat structure, comprising:
   a metallic seat structure member with a surface roughened, the surface having a plurality of anchor-shaped recesses having depth of nanometer scale; and
   a strength member made of synthetic resin, the strength member reinforcing the metallic seat structure member and having a plurality of wedge-shaped leg portions embedded in the plurality of anchor-shaped recesses.

2. The vehicle seat structure according to claim 1, wherein a point of load applied to the seat structure member is located at a supporting portion of a reclining apparatus.

3. The vehicle seat structure according to claim 1, wherein the strength member is made of any one of polyphenylene sulfide, polybutylene terephthalate, and polyamide.

4. The vehicle seat structure according to claim 1, wherein the seat structure member is made of any one of aluminum, magnesium, copper, stainless, titanium, iron, and brass.

5. The vehicle seat structure according to claim 1, wherein the strength member includes a plurality of continuous substantially-honeycomb structures.

6. The vehicle seat structure according to claim 1, wherein a point of load added to the seat structure member is located at a supporting portion of a seat belt retractor.

* * * * *